(12) United States Patent
Kim et al.

(10) Patent No.: US 8,764,079 B1
(45) Date of Patent: Jul. 1, 2014

(54) PEDESTRIAN PROTECTIVE RADIATOR GRILL

(71) Applicant: Hyundai Motor Company, Seoul (KR)

(72) Inventors: Nam Cheol Kim, Gyeonggi-do (KR); Hun Soo Kim, Gyeonggi-do (KR); Jin Wook Lee, Busan (KR); Hae Ryong Kim, Incheon (KR); Hee Chan Yang, Gyeonggi-do (KR); Tae Soo Jung, Gyeonggi-do (KR); Jeong Ho Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/829,952

(22) Filed: Mar. 14, 2013

(30) Foreign Application Priority Data

Dec. 26, 2012 (KR) .......................... 10-2012-0152954

(51) Int. Cl.
*B60R 19/52* (2006.01)

(52) U.S. Cl.
CPC ..................................... *B60R 19/52* (2013.01)
USPC ....................................................... 293/115

(58) Field of Classification Search
CPC B60R 19/52; B60R 2019/525; B60K 11/085; B60K 11/08; B60K 11/04; B02D 25/084
USPC ............ 293/115; 180/68.4, 68.6; 296/187.09, 296/193.09, 193.1, 187.04
See application file for complete search history.

(56) References Cited

U.S. PATENT DOCUMENTS

| | | | | |
|---|---|---|---|---|
| 4,457,558 A * | 7/1984 | Ishikawa | | 296/180.5 |
| 4,944,540 A * | 7/1990 | Mansoor et al. | | 293/115 |
| 5,503,444 A * | 4/1996 | Rouse et al. | | 293/115 |
| 6,802,556 B2 * | 10/2004 | Mattsson et al. | | 296/187.09 |
| 7,571,955 B2 * | 8/2009 | Nagae et al. | | 296/187.09 |
| 7,597,166 B2 * | 10/2009 | Parks | | 180/69.2 |
| 7,669,685 B2 * | 3/2010 | Takahashi et al. | | 180/271 |
| 7,836,996 B2 * | 11/2010 | Kitte et al. | | 180/271 |
| 7,881,843 B2 * | 2/2011 | Murakami et al. | | 701/45 |
| 8,567,854 B2 * | 10/2013 | Nishi et al. | | 296/193.09 |

(Continued)

FOREIGN PATENT DOCUMENTS

| | | |
|---|---|---|
| JP | 2007-320530 A | 12/2007 |
| JP | 2010000881 A | 1/2010 |
| KR | 10-1998-029206 | 7/1998 |

*Primary Examiner* — Kiran B Patel (74) *Attorney, Agent, or Firm* — Edwards Wildman Palmer LLP; Peter F. Corless (57) ABSTRACT

A pedestrian protective radiator grill includes a radiator grill, an operation unit, and a guide unit. The radiator grill is provided at a front end portion of a vehicle and has an upper end portion that moves forward away from a vehicle body so that the radiator grill becomes perpendicular to the ground. The operation unit is connected to the radiator grill and pushes the radiator grill in a forward direction of the vehicle when an impact signal is input. The guide unit provided under the radiator grill guides forward linear movement of the radiator grill when the radiator grill is pushed forward by the operation unit, and guides rotational movement of the upper end portion of the radiator grill after the radiator grill reaches an end of its movable range.

7 Claims, 6 Drawing Sheets

(56) References Cited

U.S. PATENT DOCUMENTS

| | | | |
|---|---|---|---|
| 2004/0195020 A1* | 10/2004 | Suwa et al. | 180/68.4 |
| 2007/0102219 A1* | 5/2007 | Park | 180/274 |
| 2007/0125589 A1* | 6/2007 | Murphy | 180/274 |
| 2009/0026798 A1* | 1/2009 | Lee | 296/187.04 |
| 2009/0058141 A1* | 3/2009 | Hirukawa | 296/193.1 |
| 2009/0295193 A1* | 12/2009 | Park | 296/187.04 |
| 2010/0243352 A1* | 9/2010 | Watanabe et al. | 180/68.1 |
| 2011/0282538 A1* | 11/2011 | Tamura et al. | 701/29 |

* cited by examiner

PEDESTRIAN PROTECTIVE RADIATOR GRILL

CROSS-REFERENCE TO RELATED APPLICATION

This application claims under 35 U.S.C. §119(a) the benefit of Korean Patent Application No. 10-2012-0152954 filed Dec. 26, 2012, the entire contents of which are incorporated herein by reference.

BACKGROUND (a) Technical Field

The present invention relates to a pedestrian protective radiator grill, and more particularly to a pedestrian protective radiator grill which, when a vehicle accidentally hits a pedestrian, moves to a pedestrian protecting position where the radiator grill has an almost vertical profile, so as to mitigate injuries of the pedestrian hit by the vehicle.

(b) Description of the Related Art

A bumper is the front-most or rear-most part of a car, and the first part to absorb impact when the car collides with an object. However, generally, the bumper does very little to lessen the impact on a pedestrian who is hit by the car.

Figure 1A:
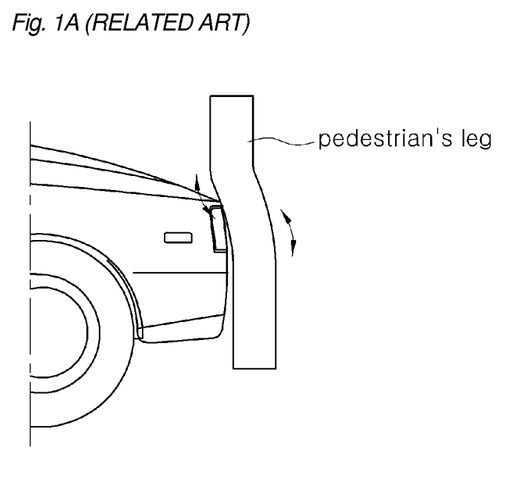
FIGS. 1A and 1B (RELATED ART) are diagrams depicting a leg injury of a pedestrian hit by a vehicle.
Figure 1B:
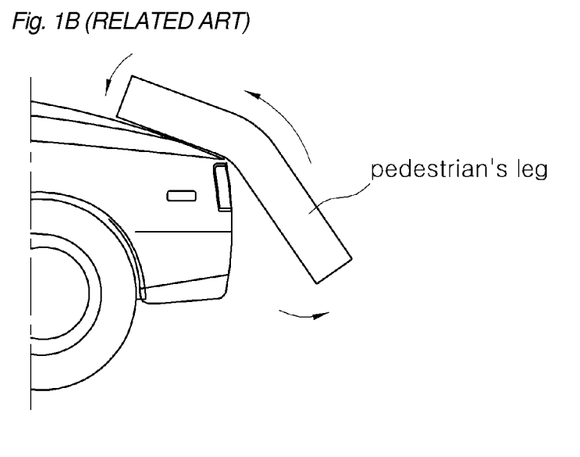

FIGS. 1A and 1B (RELATED ART) are diagrams to show a state in which a pedestrian is hit by the front bumper of a car.

With reference to FIGS. 1A and 1B, because of the structural characteristic in which the front bumper protrudes from the front end of the body of a car, when the car accidentally hits a pedestrian, the impact to the pedestrian is concentrated on the pedestrian's leg, especially on the knee, and as a result, the shin or thigh of the pedestrian tends to severely bend due to the impact as shown in FIG. 1A, and the shin or thigh can be severely injured as shown in FIG. 1B, which may result in serious damage to the leg.

Japanese Patent Application Publication No. 2010-000881 discloses a structure mounted to the front grill of an automobile. However, this technology cannot satisfactorily mitigate injuries sustained by a pedestrian who is hit by a car.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made to address the above problems occurring in the related art, and the present invention is directed to a pedestrian protective radiator grill which, when a car (or other vehicle) hits a pedestrian, moves to a pedestrian protecting position where the radiator grill has an almost vertical profile, so as to mitigate injuries of the pedestrian.

In order to achieve the above object, according to one aspect of the present invention, there is provided a pedestrian protective radiator grill including a radiator grill provided at a front end portion of a vehicle and configured to move in a manner that an upper end portion of the radiator grill moves forward to be away from a body of the vehicle so that an entire body of the radiator grill has a substantially perpendicular profile with respect to the ground, an operation unit connected to the radiator grill and configured to push the radiator grill in a forward direction of the vehicle when an impact signal is input, and a guide unit provided under the radiator grill, the guide unit guiding forward linear movement of the radiator grill when the radiator grill is pushed forward by the operation unit, and guiding rotational movement of the upper end portion of the radiator grill after the radiator grill is pushed in the forward direction up to an end of its movable range.

The operation unit may include a rod connected to a rear end portion of the radiator grill and configured to extend and retract, the radiator grill being moved by the extension and retraction of the rod. Both ends of a link may be rotatably coupled to the rod and the radiator grill, respectively.

The radiator grill may further include a reinforcing member provided on a rear surface thereof, and the operation unit may be connected to a rear surface of the reinforcing member.

The guide unit may include a guide member being formed with a slot-like guide groove that extends in a longitudinal direction and which is installed at a rear end portion of a bumper of the vehicle, and a guide pin inserted in the slot-like groove so as to move in the slot-like groove along with the radiator grill and which is provided at a lower end portion of the radiator grill.

The guide member may have a hinge structure-forming groove located under a front portion of the guide groove and being continuous to the front portion of the guide groove, so that the guide pin moves in the guide groove until reaching the front end portion of the guide groove and then the guide pin enters the hinge structure-forming groove. In this state, axial rotation is enabled.

The guide pin may have a latching notch at an upper end portion thereof. When the guide pin enters the hinge structure-forming groove, a border portion of the guide member between the guide groove and the hinge structure-forming groove is inserted into the latching notch and then latched.

The pedestrian protective radiator grill according to the present invention has an advantage of lessening an impact on a pedestrian when the pedestrian is hit by a front end of a vehicle, when the radiator grill is configured to move and rotate in such a manner that a front end profile of the radiator grill becomes substantially perpendicular to the ground.

Further, since the radiator grill utilizes a link structure and a guide structure to rotate (instead of an actuator), the radiator grill according to the present invention is advantageous in terms of protection of a pedestrian. In addition, since the radiator grill rotates after linearly moving forward a predetermined distance, the rotational movement of the radiator grill is not interfered with by the bumper, thus preventing the bumper from being damaged.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Hereinbelow, preferred embodiments of the present invention will be described in detail with reference to the accompanying drawings.

Figure 2:
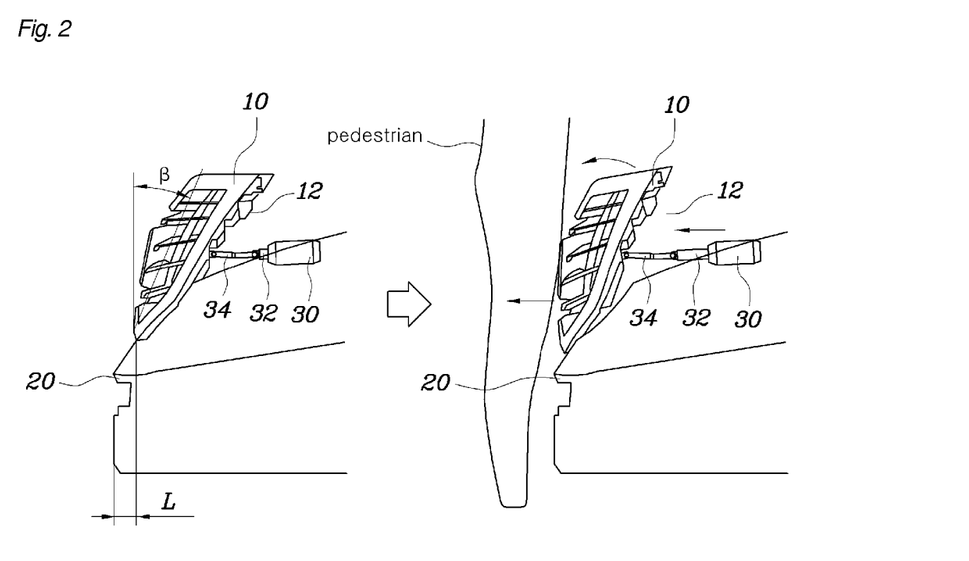
FIG. 2 is a diagram illustrating states of a pedestrian protective radiator grill before and after the pedestrian protective radiator according the present invention has moved, respectively.

FIG. 2 is a diagram illustrating states of a pedestrian protective radiator grill before and after the pedestrian protective radiator grill according the present invention has moved, respectively.

A pedestrian protective radiator grill according to the present invention, which mitigates injuries to a pedestrian, preferably includes a radiator grill 10, an actuator 30, and a guide unit.

With reference to FIG. 2, the structure of the pedestrian protective radiator grill according to the present invention will be described in detail. A radiator grill 10 is affixed to a front end portion of a vehicle. When a person or object is struck by the front end of a vehicle, an upper end portion of the radiator grill 10 moves forward to be away from the front side of the body of the vehicle so that the body of the radiator grill 10 forms, as a whole, an almost perpendicular profile with respect to the ground. An operation unit is connected to the radiator grill 10. The operation unit is configured to supply a force so as to push the radiator grill 10 in a forward direction of the vehicle, to the radiator grill 10, when an impact signal of the vehicle is input. A guide unit is provided under the radiator grill 10. When the radiator grill 10 is pushed in the forward direction of the vehicle by the operation unit, the guide unit guides linear movement of the radiator grill 10, which moves forward. The guide unit also guides rotational movement of the radiator grill 10 when the radiator grill 10 has moved forward up to an end of its movable range.

More specifically, the radiator grill 10 preferably is provided at the center of the front end portion of the vehicle, and installed at an upper portion of the bumper 20. An upper portion of the radiator grill 10 moves forward to be away from the body of the vehicle when the vehicle bumps into an object, so that the outer contour of the radiator grill 100 becomes almost perpendicular to the ground.

The operation unit preferably is installed behind the radiator grill 10. When the impact signal is input, the operation unit supplies, to the radiator grill 10, the force of moving the radiator grill 10 in the direction in which the radiator grill 10 moves away from the body of the vehicle.

The operation unit may be formed from the actuator 30. An end of the actuator 30 may be coupled to the body of the vehicle. A rod 32 may be coupled to the other end of the actuator in such a manner to extend and contract. The rod 32 may be coupled to a rear surface of the radiator grill.

When an operation signal which is generated under the condition in which the vehicle bumps into an object is input, the actuator 30 extends in the forward direction of the vehicle so as to supply to the radiator grill 10 the force of pushing the radiator grill 10 in the forward direction of the vehicle.

Figure 3:
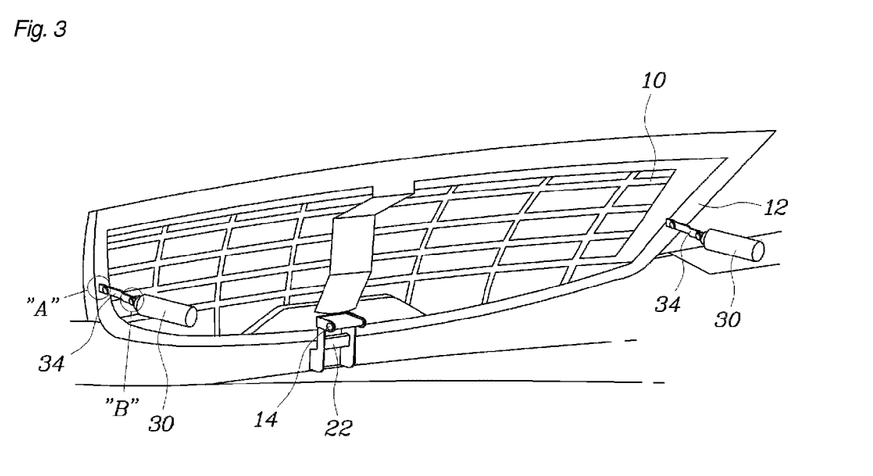
FIG. 3 is a diagram illustrating a combined structure of the radiator grill according to the present invention and an actuator.

FIG. 3 is a diagram illustrating a combined structure of the radiator grill 10 and the actuator 30 according to the present invention.

With reference to FIG. 3, a reinforcing member 12 may be installed on a rear surface of the radiator grill 10. In this case, the rod 32 of the actuator 30 may be coupled to a rear surface of the reinforcing member 12. The rod 32 of the actuator 30 supplies the force which pushes the radiator grill 10 in the forward direction of the vehicle. The rod 32 and the radiator 10 may be combined by a link 34. Both ends of the link 34 may be coupled to the rod 32 and the radiator 10 in a rotatable manner using a pin structure.

Figure 4A:
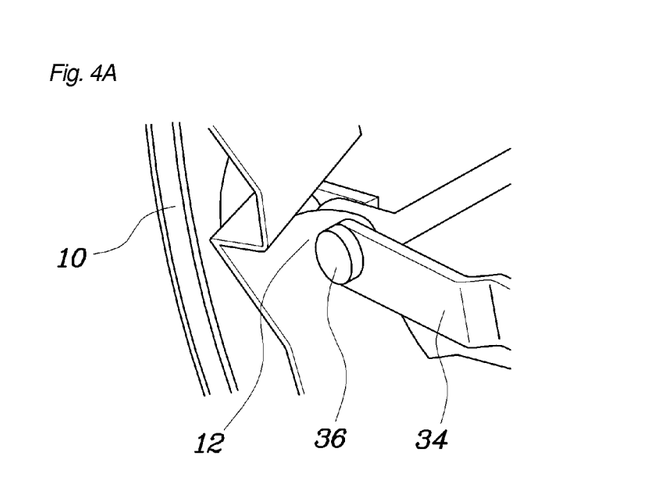
FIGS. 4A and 4B are enlarged diagrams illustrating a portion "A" and a portion "B" of FIG. 3, respectively, in an enlarged manner.
Figure 4B:
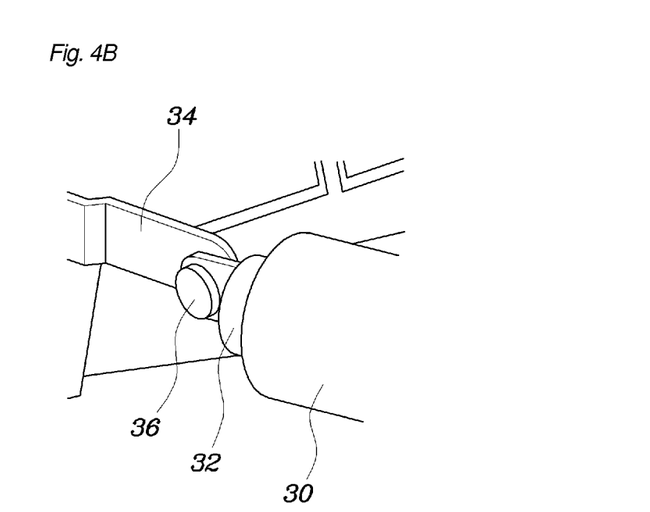
Figure 5:
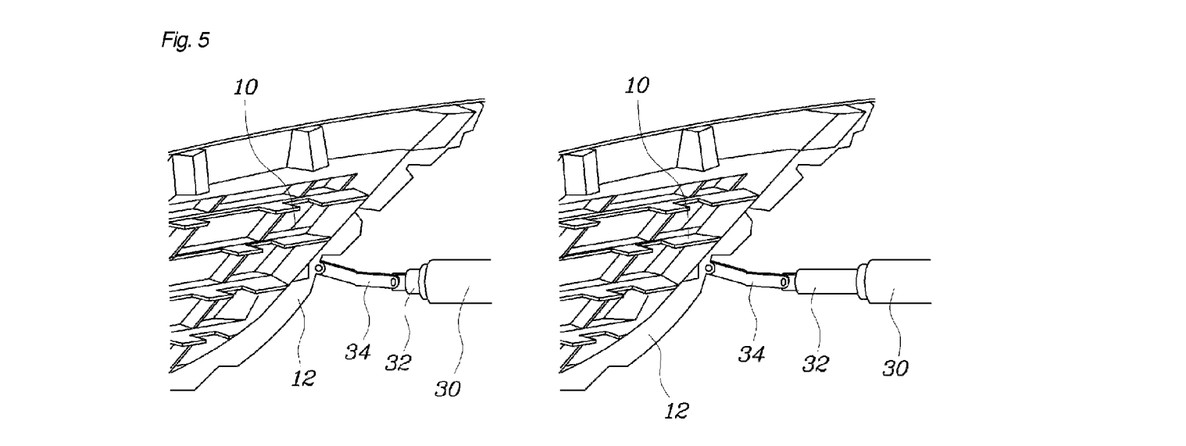
FIG. 5 is a diagram illustrating states of the actuator before and after the actuator has operated, respectively.

FIGS. 4A and 4B are enlarged diagrams showing a portion "A" and a portion "B" in FIG. 3, respectively, and FIG. 5 is a diagram illustrating states of the actuator 30 before and after operation of the actuator 30, respectively.

With reference to FIGS. 4A, 4B, and 5, both ends of the link 34 may be rotatably coupled to the rod 32 and the radiator grill 10, respectively.

One end of the rod 32 and one end of the link 34 are coupled using a coupling pin 36 so as to be able to perform relative rotational movement. The reinforcing member 12 formed on the rear surface of the radiator grill 10 and the other end of the link 34 are also coupled by a coupling pin 36 so as to perform relative rotational movement. In particular, when the rod 32 extends, both ends of the link 34 perform relative rotation with respect to the rod 32 and the radiator grill 10 so that the radiator grill 10 may rotate in the forward direction.

Figure 6:
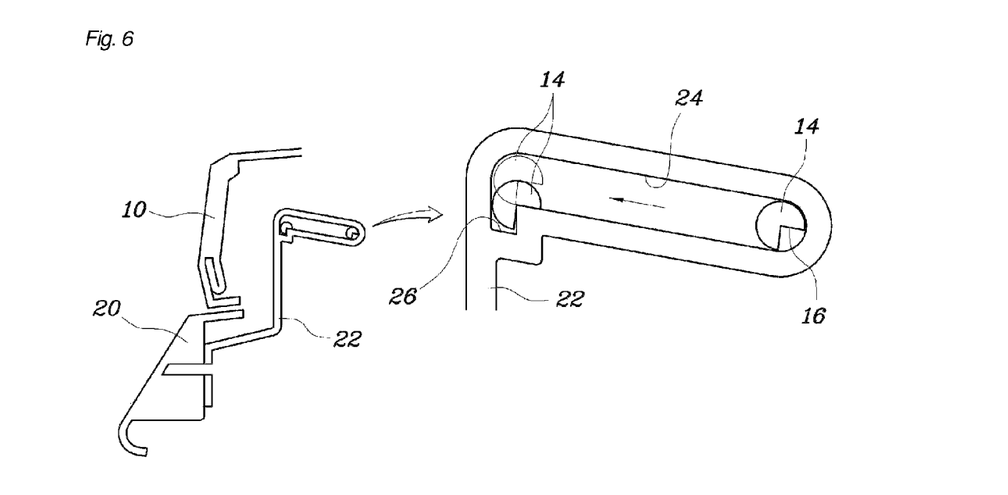
FIG. 6 is a diagram illustrating the structure of a guide unit according to the present invention.

FIG. 6 is a diagram illustrating the structure of the guide unit according to the present invention. With reference to FIG. 6, the guide unit preferably is provided under the radiator grill 10. When the radiator grill 10 is pushed in the forward direction by the actuator 30, the guide unit guides the linear forward movement of the radiator grill 10, and then guides rotational movement of an upper portion of the radiator grill 10 when the radiator grill 10 reaches a distal end of its movable range. The guide unit may include a guide member 22 and a guide pin 14.

The guide member 22 preferably is affixed to a rear end of a bumper 20. The guide member 22 has a slit-like guide groove 24 which extends in the longitudinal direction of the guide member 22. The guide pin 14 is provided at a lower end of the radiator grill 10. The guide pin 14 is inserted in the guide groove 24 so that the guide pin 14 may move in the guide groove 24 along with the radiator grill 10.

In particular, when the rod 32 of the actuator 30 extends, the rod 32 pushes the radiator grill 10 in the forward direction of the vehicle, and the guide pin 14 fixed to the radiator grill 10 moves from the rear end to the front end of the guide groove 24.

When the rod 32 further pushes the radiator grill 10 when the guide pin 14 reaches the front end of the guide groove 24, because the guide pin 14 cannot move further, the upper end portion of the radiator grill 10 rotates about the guide pin 14 serving as a rotation axis.

At this time, because the hinge structure-forming groove 26 is provided under and communicates with the front portion of the guide groove 24, the guide pin 14 which has reached the front end of the guide groove 24 enters the hinge structure-forming groove 26 and the axial rotation occurs.

A latching notch 16 is formed in an upper end portion of the guide pin 14. Accordingly, when the guide pin 14 enters the hinge structure-forming groove 26, a border portion of the guide unit between the guide groove 24 and the hinge structure installing groove 26 is latched in the latching notch 16.

In particular, when the guide pin 14 reaches the front end of the guide groove 24, the guide pin 14 enters the hinge structure-forming groove 26, and the radiator grill 10 rotates about the guide pin 14.

According to the present invention, when a pedestrian is struck by the front end of the vehicle, the radiator grill 10 is moved in the forward direction of the vehicle, and the guide pin 14 fixed to the radiator grill 10 is also moved to the front end of the guide groove 24, and then enters the hinge structure installing groove 26. Thereafter, the upper end portion of the radiator grill 10 rotates about the guide pin 14 in a manner that the upper end portion of the grill 10 moves away from the body of the vehicle. As a result, the radiator grill 10 comes to have a profile that is substantially perpendicular to the ground. This increases a contact area of the vehicle which comes into contact with a pedestrian when the pedestrian is struck by the vehicle, and thus distributes the impact force so that injuries of the pedestrian can be mitigated.

When the radiator grill 10 returns to an original position, the radiator grill 10 is first slightly lifted up so that the guide pin 14 can come out of the hinge structure-forming groove 26, and then the radiator grill 10 is moved in a sliding manner in the backward direction of the vehicle.

Figure 7:
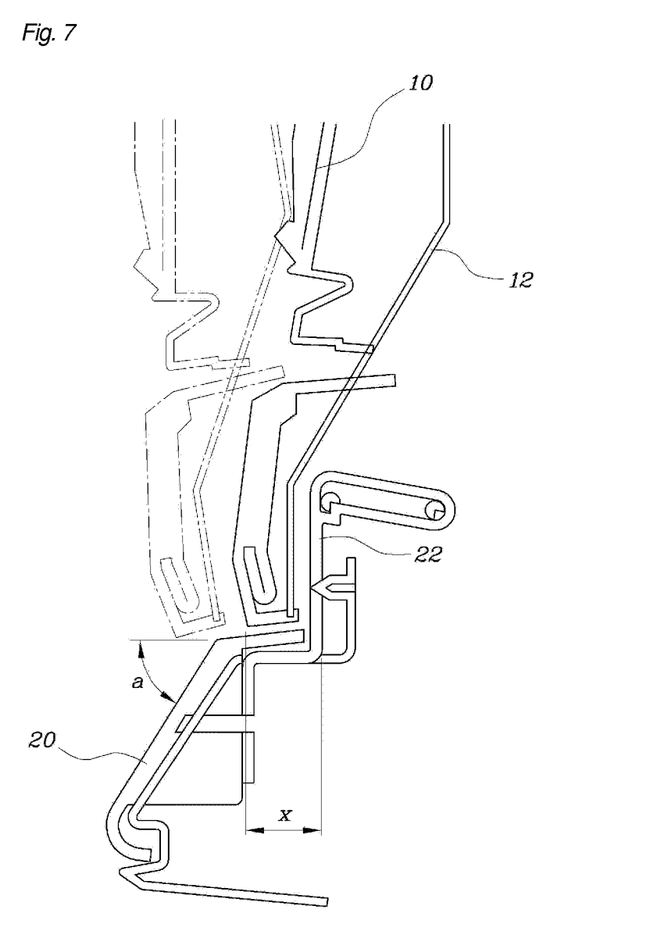
FIG. 7 is a cross-sectional view illustrating states of the pedestrian protective radiator grill before and after the pedestrian protective radiator grill according to the present invention has moved, respectively.

FIG. 7 is a sectional diagram illustrating states of the radiator grill 10 before and after the radiator gall 10 moves, respectively.

With reference to FIGS. 1A, 1B and 7, it is possible to compute the amount of forward movement of the radiator grill 10.

The amount of the forward movement of the radiator grill 10 can be calculated by the following formula:

$$Y = \frac{X \sin\beta}{\tan\alpha} + L$$

when Y is an amount of forward movement of the radiator grill 10, X is a length of a lower flange of the radiator gall 10, L is a protruding amount of the bumper 20 from a lower end of the radiator grill 10, α is a slope of a front surface of the bumper 20, and β is a slope of a front surface of the radiator gall 10.

When a pedestrian is struck by the front end of a vehicle, according to the present invention, the radiator grill 10 moves forward and rotates so that the front surface of the bumper 20 is changed to be in an almost vertical profile, thereby lessening an impact to the pedestrian and mitigating injuries sustained by the pedestrian.

Further, because the actuator does not directly rotate the radiator gall 10 but rather indirectly rotates the radiator gall 10 via the link 34 and the guide unit, the present invention provides a vehicle structure which is advantageous in terms of protection of a pedestrian. In addition, because the radiator grill 10 rotates after linearly moving forward a predetermined distance, the rotation of the radiator grill 10 is not interfered with by the bumper 20, so that the bumper 20 may not be damaged.

After the radiator has moved due to the impact, the radiator grill 10 is returned in a simple manner to the original position, which is the position of the radiator grill 10 prior to the occurrence of the vehicle collision. In this way, the radiator grill 10 can be reliably reused.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A pedestrian protective radiator grill comprising:
   a radiator grill provided at a front end portion of a vehicle and configured to move in a manner that an upper end portion of the radiator grill moves forward to be away from a body of the vehicle so that an entire body of the radiator grill has a substantially perpendicular profile with respect to the ground;
   an operation unit connected to the radiator grill and configured to push the radiator grill in a forward direction relative to the vehicle when an impact signal is input; and
   a guide unit provided under the radiator grill, the guide unit guiding forward movement of the radiator grill when the radiator grill is pushed forward by the operation unit, and guiding rotational movement of the upper end portion of the radiator grill after the radiator grill is pushed in the forward direction up to an end of a movable range.

2. The pedestrian protective radiator grill according to claim 1, wherein the operation unit includes a rod connected to a rear end portion of the radiator grill and which is configured to extend and retract, the radiator grill being moved by the extension and retraction of the rod.

3. The pedestrian protective radiator grill according to claim 2, wherein opposite ends of a link are rotatably coupled to the rod and the radiator grill, respectively.

4. The pedestrian protective radiator grill according to claim 1, wherein the radiator grill further includes a reinforcing member provided on a rear surface, the operation unit being connected to the rear surface of the reinforcing member.

5. The pedestrian protective radiator grill according to claim 1, wherein the guide unit includes a guide member being formed with a slot-like guide groove that extends in a longitudinal direction and which is installed at a rear end portion of a bumper of the vehicle, and a guide pin inserted in the slot-like groove so as to move in the slot-like groove along with the radiator grill and which is provided at a lower end portion of the radiator grill.

6. The pedestrian protective radiator grill according to claim 5, wherein the guide member has a hinge structure-forming groove located under a front portion of the guide groove so as to communicate with the front portion of the guide groove, and the guide pin which has moved to the front end portion of the guide groove enters the hinge structure-forming groove to enable axial rotation of the radiator grill.

7. The pedestrian protective radiator grill according to claim 6, wherein the guide pin has a latching notch at an upper end portion of the guide pin, and when the guide pin enters the hinge structure-forming groove, a border portion of the guide member between the guide groove and the hinge structure-forming groove is inserted into and latched in the latching notch.

* * * * *